UNITED STATES PATENT OFFICE.

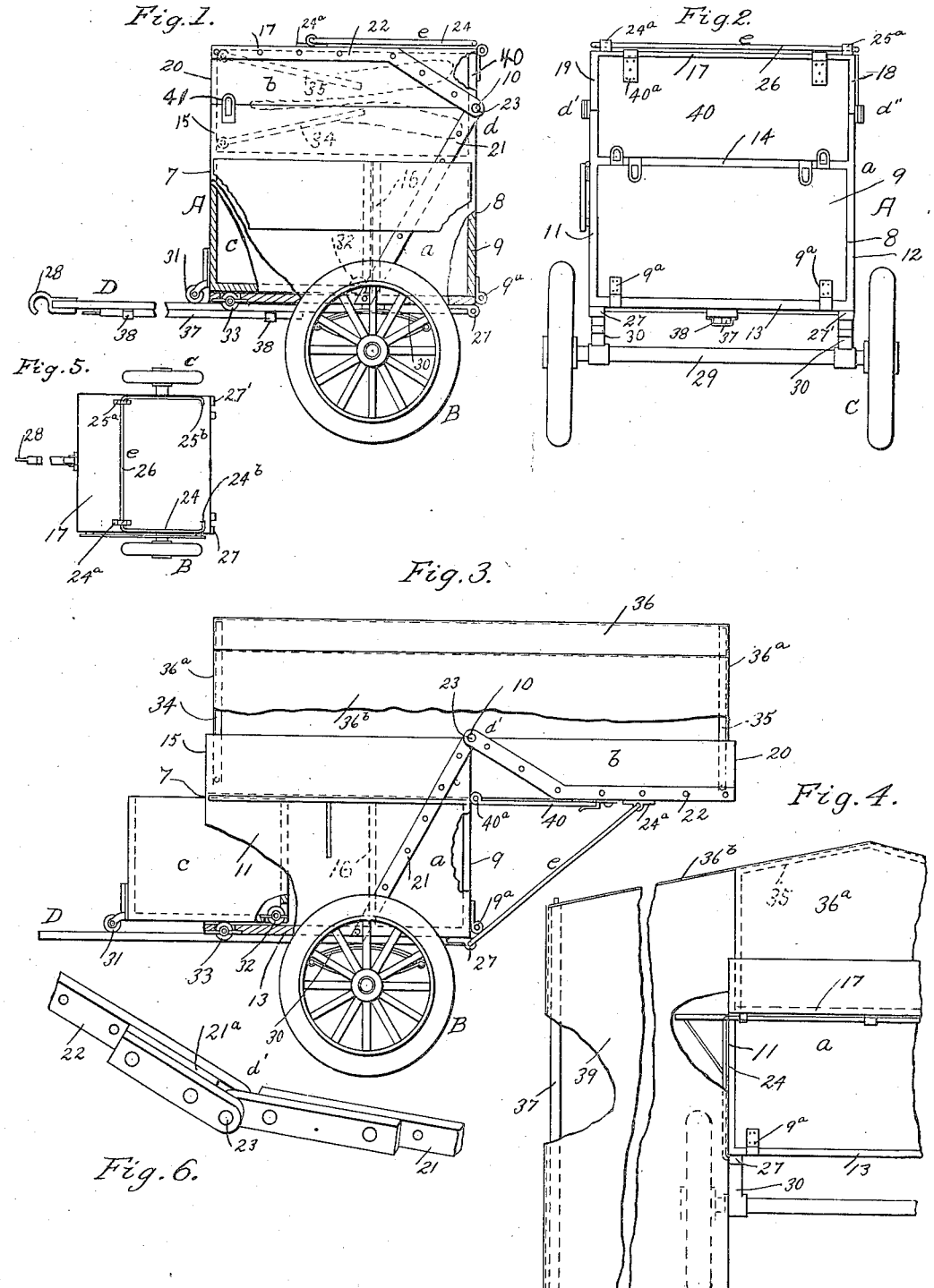

WOODBURY SAXTON BRINTNALL, OF LOS ANGELES, CALIFORNIA.

EQUIPMENT-VEHICLE.

1,194,595.

Specification of Letters Patent.

Patented Aug. 15, 1916.

Application filed May 14, 1915. Serial No. 28,116.

*To all whom it may concern:*

Be it known that I, WOODBURY SAXTON BRINTNALL, a citizen of the United States, residing at Los Angeles, in the county of Los Angeles and State of California, have invented new and useful Improvements in Equipment-Vehicles, of which the following is a specification.

This invention relates to equipment vehicles, and more particularly to equipment vehicles for the use and comfort of travelers and campers, and the invention has for its object to provide an improved vehicle which may be readily attached to an automobile or other vehicle, to trail the same, and whereby the pre-requisites of travel may be conveniently transported, and which may serve when in extended position, as a bed, as well as being useful for many other purposes, and which when in folded position is compact, neat in appearance, and which may trail closely behind the automobile or other vehicle drawing the same.

A further object of the invention is to provide an improved equipment vehicle of the general nature above set forth which will be superior in point of relative simplicity and inexpensiveness in construction and organization, taken in consideration with compactness in form, convenience and facility in compacting and extending and in sightliness in appearance, and which will be generally superior in efficiency and serviceability.

With the above and other objects in view, the invention consists in the novel and useful provision, construction, formation, combination, association and interrelation of parts, members and features, all as hereinafter described, shown in the drawing and finally pointed out in claims.

In the drawing: Figure 1 is a side elevation of an equipment vehicle device, constructed and organized to embody the invention, the same being shown in compacted position for use *en route*, parts being broken away for clearness of illustration; Fig. 2 is a rear end elevation of the equipment vehicle shown in Fig. 1; Fig. 3 is a side elevation of the equipment vehicle in extended position, parts being broken away and sectioned for clearness of illustration; Fig. 4 is a fragmentary rear end elevation of the equipment vehicle in extended position, parts being broken away for clearness of illustration, further features being added; Fig. 5 is a plan view, on a reduced scale of the showing in Figs. 1 and 2; and Fig. 6 is a detail isometric view of the preferred form of certain features of the invention.

Corresponding parts in all the figures are designated by the same reference characters.

Referring with particularity to the drawing, in the embodiment of the invention therein shown, A designates a vehicle body, B and C designate, respectively, wheels therefor, and D designates a tongue by means of which the vehicle is secured to the drawing vehicle, not shown.

The vehicle body A comprises a box-like member *a*, a hinged member *b*, and a drawer member *c*, the box-like body member *a* being open at its forward end as at 7 to receive the drawer member *c*, and open at its rearward end 8 to permit storage and removal of goods, the open rearward end 8 being provided with a closure 9 hinged to the body member as at 9ª. The foldable member *b* is hinged to the body member *a* at the rearward end of such body member and at the top thereof, as at 10 so as to overlie the body member when the device is folded or in compact form. Hinge means *d* serve to unite the body member *a* and foldable member *b*.

The body member *a* comprises side walls 11 and 12, a bottom wall 13, a top wall 14 disposed below the tops of the side walls and extending from end to end of the body member, and a forward end wall 15 extending from the top wall 14 to a height even with the side walls, a vertical partition 16 being provided between the drawer member and the hinged closure 9.

The member *b* comprises a horizontal wall 17, vertical side walls 18 and 19, respectively, and an end wall 20 disposed at that end of the member opposite the hinge means *d*, the entirety being a box-like structure with an open top and with an open end.

The hinge means *d* unite the open end of the member *b* with the open rearward end of the similarly formed box-like structure at the top of the member *a*, such means preferably comprising a hinge *d'* disposed at one side of the vehicle body and a hinge *d''* disposed at the other side of the vehicle body; each such hinge *d'* or *d''* comprises a downwardly and forwardly ranging preferably metallic strap 21 secured to the member *a*, a preferably metallic strap 22 secured to the member *b* so as to range across and longitudinally of the side thereof and bifurcated at one end as at 21ª, and a pin or pivot 23 uniting the bifurcated end 21ª of the strap 22 with one end of the strap 21, which end is disposed between the furcations of the strap 22.

Supporting means e are provided on the member b to assist the hinge in supporting the member b when in extended or unfolded position, and serve to brace such member b from the body member a. The means e preferably comprise a link 24, journals 24ª and 25ª, and a transverse shaft 26 extending through the journals 24ª and 25ª, the link 24 being provided with an inturned end 24ᵇ and the link 25 being provided with an inturned end 25ᵇ, such link ends 24ᵇ and 25ᵇ being adapted to take into and co-act with suitable eyes or sockets 27 and 27′, respectively, secured to the body member a at the lowermost rearward portion thereof, when the device is in unfolded or extended position.

The tongue D is secured to the bottom wall 13 of the body member a, passing beneath the same so as to be easily secured thereto as by screws, bolts or the like. The tongue extends forwardly of the body portion such distance as is necessary to provide the required or preferred distance between the trailing equipment vehicle and the towing vehicle, terminating in a suitable hook or other fastening device 28, by means of which it may be attached or secured to the rear axle or other rearward portion of the towing vehicle.

The wheels B and C are each rotatably mounted at one end of an axle 29, such axle being secured beneath the vehicle body in any preferred manner, as for instance, by means of springs 30 which are interposed between the axle and body to relieve the vehicle body from the jar and jolt incident to travel along the roadway.

The drawer member c is provided at its forward end with a roller or caster 31 adapted to ride on the tongue D as the drawer is opened or withdrawn from the member a. Rollers 32 are provided at the rearward end of the drawer and coact with the bottom wall 13 to support the drawer member. Other rollers 33 are journaled in the bottom wall 13 near the forward portion of the member a to assist in supporting the drawer member c, and facilitate insertion or withdrawal of the drawer member c.

A forward cover supporting bow or arch comprising a thin strip or the like 34 is pivoted within the forward portion of the member a, extending from side to side thereof and being positioned inwardly of the side walls 11 and 12, such bow 34 being pivoted just above the top wall 14 of the member a, and a similar bow member 35 is pivoted inside the member b, to the side walls 18 and 19 thereof and near the end wall 20, a textile, rubber or other suitable covering 36 provided with end walls 36ª and side walls 36ᵇ being fixed to and over the bows 34 and 35. Tent poles 37 may be carried beneath the vehicle body and beneath the tongue D thereof, being held in place, as by straps 38, and such tent poles in use are placed under one of the side flaps 36ᵇ, as illustrated in Fig. 4, to provide an increased sheltered area which may also be protected by stretching a vertical sheath 39 around the poles 37. A closure 40 is hinged to the horizontal wall 17 of the member b at the open end of such member, as at 40ª.

The operation, method of use and advantages of the improved vehicle equipment will be readily understood from the foregoing description, taken in connection with the accompanying drawing and the following statement. When the device is in the position shown in Figs. 1, 2 and 5, the member b is folded over and lies upon the body member a where it may be secured in closed position, as by a latch or the like 41, the tent supporting bows 34 and 35 being folded into their respective members a or b and the tent covering together with other equipment or goods will be housed in the space provided between and in the box-like members a and b. The closure 40 is now in position to close the open ends of both the member b and the similarly formed upper portion of the member a. The links 24 and 25 lie upon the member b, the drawer is closed and the closure 9 covers the open end of the body member a. When it is desired to use the device as a bed or for other camp purposes, the member b is swung on the hinge means d to the position shown in Fig. 3. The link ends 24ᵇ and 25ᵇ are secured or hooked into their respective eyes or sockets 27 and 27′, the inherent springiness of the links 24 and 25 allowing sufficient distortion to position the ends 24ᵇ and 25ᵇ in their respective sockets. The bows 34 and 35 may now be raised to vertical position and the covering 36 is stretched, and in case the additional tent features illustrated in Fig. 4 are required, the poles 37 may be unstrapped and such tent built up of the flap 36ᵇ and the sheath 39. The device may be readily folded up as by removing the tent poles and sheath 39 and folding the tent covering 36 with the bows 34 and 35 into the space confined between the box-like member b and the member a, the closure 40 again being brought to the position shown in Figs. 1 and 2.

Having thus disclosed my invention, I claim and desire to secure by Letters Patent:

1. A vehicle provided with a tongue and a box-like body, and an extension of said body telescoping in said body, there being an anti-friction device between such body extension and the tongue.

2. A vehicle provided with a tongue and a box-like body, and an extension of said body telescoping in said body, there being an anti-friction device between such body extension and the tongue; there being a further anti-friction device between the body and said extension.

3. A vehicle provided with a tongue and a box-like body, and an extension of said body telescoping in said body, there being an anti-friction device between such body extension and the tongue; said body being also provided with a compartment provided with a hinged closure.

4. A vehicle body having a first box-like structure, a second box-like structure hinged to swing into position either above said first box-like structure or to constitute a continuous extension of the same, the ends of said box-like structures when so extended being open, and said two box-like structures when in superposed relation inclosing a storage compartment; and a closure carried by one of said box-like structures and adapted to cover both of said open ends when said structures are in superposed relation.

5. A vehicle body provided with a telescoping extension and a compartment provided with a hinged closure, and having a wall which limits the telescoping movement of said extension; said body being provided with a superposed box-like structure.

6. A vehicle body provided with a telescoping extension and a compartment provided with a hinged closure, and having a wall which limits the telescoping movement of said extension; said body being provided with a superposed box-like structure; there being a hinged box-like structure mounted to swing into position above said first named box-like structure, and likewise to be swung into position to constitute an extension thereof.

7. A vehicle body provided with a telescoping extension and a compartment provided with a hinged closure, and having a wall which limits the telescoping movement of said extension; said body being provided with a superposed box-like structure; there being a hinged box-like structure mounted to swing into position above said first named box-like structure, and likewise to be swung into position to constitute an extension thereof; means being carried by said last named hinged box-like structure and adapted to be extended between the same and the vehicle body as a brace for the former.

8. A vehicle body provided with a telescoping extension and a compartment provided with a hinged closure, and having a wall which limits the telescoping movement of said extension; said body being provided with a superposed box-like structure; there being a hinged box-like structure mounted to swing into position above said first named box-like structure, and likewise to be swung into position to constitute an extension thereof; said two box-like structures when in end to end relation embracing a continuous open space.

9. A vehicle body provided with a telescoping extension and a compartment provided with a hinged closure, and having a wall which limits the telescoping movement of said extension; said body being provided with a superposed box-like structure; there being a hinged box-like structure mounted to swing into position above said first named box-like structure, and likewise to be swung into position to constitute an extension thereof; said box-like structures when in superposed relation inclosing a storage compartment.

10. A vehicle body provided with a telescoping extension and a compartment provided with a hinged closure, and having a wall which limits the telescoping movement of said extension; said body being provided with a superposed box-like structure; there being a hinged box-like structure mounted to swing into position above said first named box-like structure, and likewise to be swung into position to constitute an extension thereof, and a collapsible shelter adapted to be housed within said box-like structures when in superposed relation, and when in extended position to be erected thereon.

11. A vehicle body provided with a telescoping extension and a compartment provided with a hinged closure, and having a wall which limits the telescoping movement of said extension; said body being provided with a superposed box-like structure; there being a hinged box-like structure mounted to swing into position above said first named box-like structure, and likewise to be swung into position to constitute an extension thereof, and a collapsible shelter adapted to be housed within said box-like structures when in superposed relation, and when in extended position to be erected thereon; said shelter being provided with frame members respectively pivoted in said box-like structures.

12. A vehicle body provided with a telescoping extension and a compartment provided with a hinged closure, and having a wall which limits the telescoping movement of said extension; said body being provided with a superposed box-like structure; there being a hinged box-like structure mounted to swing into position above said first named box-like structure, and likewise to be swung into position to constitute an extension thereof; said box-like structures when in superposed relation inclosing a storage compartment; said box-like structures having open ends adapted to register when said structures are in end to end relation, and one of said structures carrying a hinged closure adapted to cover both of said open ends when said structures are in superposed relation.

13. A vehicle body having a compartment provided with a hinged closure, and said body being provided with a superposed box-like structure; there being a hinged box-like structure mounted to swing into position above said first named box-like structure, and likewise to be swung into position to constitute an extension thereof, said box-like structures when in superposed relation inclosing a storage compartment; said box-like structures having open ends adapted to register when said structures are in end to end relation, embracing a continuous open space; and a closure carried by one of said structures; said closure being adapted to cover both of said open ends when said structures are in superposed relation.

14. A vehicle body having a box-like structure; there being a hinged box-like structure mounted to swing into position above said first named box-like structure, and likewise to be swung into position to constitute an extension thereof, said box-like structures when in superposed relation inclosing a storage compartment; said box-like structures having open ends adapted to register when said structures are in end to end relation, embracing a continuous open space; and a closure carried by one of said structures; said closure being adapted to cover both of said open ends when said structures are in superposed relation.

In testimony whereof, I have signed my name to this specification in the presence of two subscribing witnesses.

WOODBURY SAXTON BRINTNALL.

Witnesses:
  ALFRED H. DAEHLER,
  FRANCIS L. ISGRIGG.